UNITED STATES PATENT OFFICE.

PETER KLEBER, OF ST. JOHANN-SAARBRÜCK, GERMANY.

ARTIFICIAL STONE.

SPECIFICATION forming part of Letters Patent No. 581,466, dated April 27, 1897.

Application filed September 10, 1896. Serial No. 605,430. (No specimens.)

*To all whom it may concern:*

Be it known that I, PETER KLEBER, a subject of the Emperor of Germany, residing at St. Johann-Saarbrück, in the Kingdom of Prussia, Empire of Germany, have invented certain new and useful Improvements in Methods of Making Waterproof Stone, of which the following is a specification.

This invention relates to a method of making artificial stone from plaster-of-paris, which stone under the influence of air can neither become spotty nor decay. This is accomplished by subjecting a plaster-of-paris mixture to chemical and mechanical processes in such a manner that, contrary to the ordinary method of treating plaster-of-paris mixtures, molecular changes are produced under pressure, whereby a stone is produced which affords resistance to mechanical as well as atmospheric influences.

The process is as follows: Plaster-of-paris is combined with a mixture of potash and hydrated lime for the purpose of producing a plastic mass which does not harden at once. By further treatment with diluted sulfuric acid and gypsum-water the following takes place: First of all the potash is dissolved and with the lime produces carbonate of lime and caustic potash,

The carbonate of lime is decomposed by the diluted sulfuric acid and carbonic acid is set free and gypsum is formed,

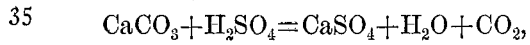

and the caustic potash is converted by the sulfuric acid into sulfate of potash, which remains in solution and runs off. A plastic mass is thus obtained which does not harden at once and which can be subjected to pressure in suitable molds. By the pressure a molecular displacement is secured and also an increased adhesion of the parts, and thereby a stone is produced which has extraordinary powers of withstanding temperature changes and affords great resistance to pressure and tension. An additional treatment with alum solutions is provided for the purpose of removing any alkali still present, as the alkali decomposes the alum and produces alumina, which increases the hardness of the stone.

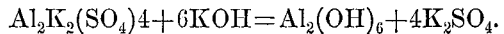

In practice the process is carried out in the following manner: Ten parts of screened ashes, potash, or other carbonates of alkalies are mixed dry with one part of a mixture composed of eighty parts of plaster-of-paris and twenty parts of hydrated lime. The resultant mixture, after having been thoroughly worked and mixed, is formed into a plastic mass by mixing it with gypsum-water that has been acidulated by means of five per cent. of sulfuric acid, and this mass is worked and kneaded until a mass has been obtained that is entirely plastic. From this stones, &c., are formed, which are subjected to great pressure in suitable molds. The green stones thus obtained are placed into a saturated alum solution or any other alumina solution which has been acidulated by one-third of sulfuric acid, and then the stones are ready for use.

Having thus described my invention, the following is what I claim as new therein and desire to secure by Letters Patent:

The process of making building-stones consisting in mixing dry, potash, with a mixture of plaster-of-paris and hydrated lime, then treating with saturated acidulated gypsum-water, to form a plastic mass and then pressing in molds and placing the stones obtained into a saturated acidulated alum solution, substantially as set forth.

In witness whereof I hereunto set my hand in presence of two witnesses.

PETER KLEBER.

Witnesses:
W. HAUPT,
HENRY HASPER.